Patented Feb. 18, 1930

1,747,861

UNITED STATES PATENT OFFICE

ALBERT DAVID, OF NEW YORK, N. Y., ASSIGNOR, BY MESNE ASSIGNMENTS, TO DIP-IT INC., OF NEW YORK, N. Y., A CORPORATION, OF NEW YORK

LIQUID DYEING, COLORING, AND TINTING COMPOSITION

No Drawing. Application filed March 25, 1922. Serial No. 546,799.

The present invention relates to liquid dyeing, coloring or tinting compositions of such natures that the same may be readily and safely packaged, without danger of leakage or of caking or solidification of the contents, in various types of containers, but particularly in collapsible tubes, a result hitherto not obained in the art in a practical and commercial manner. The invention relates also to methods of making such compositions.

It is an object of the present invention to devise a liquid dyeing, coloring or tinting composition which shall be substantially free from soap and other thickening agents. In this way I avoid caking of the product in the container, which generally occurs with liquid dyeing compositions containing soap and other thickening agents. In this way I also avoid the formation of specks on the fabric being dyed, which occur where a liquid dye is used containing soap which, coming into contact with the dissolved mineral constituents of the water in which the dyeing operation takes place, forms insoluble soaps or "lakes", with the undesirable consequences referred to.

Also, by avoiding the use of soap and similar thickening agents, my product is much more readily and completely soluble, even in cold water, a result of great importance especially for the dyeing of silk fabrics, since to dye these fabrics in hot water removes the substances with which the silk has been weighted and thus weakens the fabric materially. Moreover, by avoiding the use of soap and similar thickening agents, I find that I have a wider range of dyes which I may use with success in the manufacture of my product.

It is a further object of the present invention to provide a liquid dyeing, coloring or tinting composition which shall have a high degree of viscosity, which shall have a low freezing point so as to be adapted for shipment and use in very cold weather, and which shall have a small degree of expansion, so as to be capable of shipment into very hot climates.

A still further object of the present invention is to provide a liquid dyeing, coloring and tinting composition which shall be free from readily volatile solvents, thus avoiding the caking and solidification of the dye which would take place on the evaporation of the solvent, and avoiding also the too great fluidity which would cause leakage from the collapsible tube or other container, and the too great expansion which might cause similar leakage or even bursting of the tube when shipped into hot climates.

By way of example, I shall in the accompanying specification describe an illustrative embodiment of the present invention. It is, however, to be understood that my invention is not limited to the specific embodiment thereof herein described for purposes of illustration only.

In preparing a liquid dyeing, coloring or tinting composition having the desired properties and avoiding the disadvantages set forth above, I prefer to use a hygroscopic solvent of a highly viscous nature. Preferably such a solvent should also be non-volatile. I have discovered that the higher alcohols, that is, alcohols containing more than two atoms of carbon in their constitution, and particularly the polyhydric alcohols, that is, alcohols containing more than two hydroxyl groups in their constitution, are very well suited for this purpose.

Of such alcohols the one which I have found to be most perfectly suited for the desired purpose is glycerine. I have found that glycerine possesses the desired degree of viscosity, that it may be used with a wide range of dyes, comprising the direct, acid and basic colors, that it is non-volatile to the desired extent, and that it may be used with great success without the addition of soap or other thickening agents, and without the use of volatile solvents such as methyl or ethyl alcohol.

I prefer that the glycerine used shall be substantially or even absolutely anhydrous. The reason for this is that I have found that while a large quantity of water added to the glycerine will give a product which will readily dissolve the desired amount of dye, but resulting, however, in a thin and unsuitable product for the purpose in view, a small amount of water, while leaving the product with the desired degree of viscosity, may act to precipitate some of the dye from solution and thus introduce the possibility of caking and of partial solidification of the dye in its container, a result carefully to be avoided.

The relative proportions of dye and viscous solvent, such as glycerine, will depend, of course, upon the shade of the tint which it is desired to obtain. For coloring and tinting compositions, the dye will be substantially completely dissolved in the solvent, the amount of dye in complete solution depending, as already stated, upon the shade which the product is intended to have.

However, where it is desired to produce deep shade dyes, I have discovered that a very superior and highly satisfactory product may be obtained by grinding the dye in the presence of the solvent. In such cases, the amount of dye should be in excess of the amount which will dissolve in the solvent, such as substantially anhydrous glycerine. The grinding operation is continued until the dye is reduced to a very fine state of subdivision, and the resulting product contains the dye partly in solution and partly very fine, even colloidal, moist suspension.

The product, whether in the form of a viscous liquid containing the dye substantially completely in solution, or partly in solution and partly in fine, even colloidal, moist suspension, is now suitably packaged. I have found that the product made as above described, possesses the very valuable property that it may safely and economically be packaged in collapsible tubes without danger of leakage. This is a result hitherto not obtained with the products till now used, since these products either contain soap or other thickening agents, in such a way as to render likely their caking and solidification in the container or at the outlet of the same, or contain volatile solvents, which render possible similar undesirable consequences.

Where the product, either in the form of the tinting and coloring solution, or in the form of the deep shade dye suspension, is packaged in the collapsible tube, it will be found that, owing to the absence of soap or other thickening agent and to the absence of any readily volatile solvent, the product will not cake, harden or solidify in the tube, nor will it leak out. Due to these properties, also, the product may be dispensed in a neat, clean and economical manner from the collapsible tube, a result of great importance and commercial value, and of great merit in the minds of the intended users of such products.

The product described above, in the case, first, of the coloring or tinting composition, due to the complete solution of the dye in the solvent and due also to the hygroscopic nature of the solvent, is capable of instant dilution upon its addition to the water in which the dyeing is to take place, even if the water is cold. This result is further rendered possible by reason of the absence of soap or other thickening agent which would tend to retard solution and dilution, and even to form insoluble products which would tend to spot or streak the fabric being dyed.

In the case of the deep shade dye, especially where the same has been manufactured in the manner indicated above, each tiny particle of dye in suspension in the solution of dye is surrounded with the hygroscopic solvent, so that upon the addition of the dye to the water in which the dyeing operation is to take place, even if the water is cold, the undissolved particles of dye will be readily dissolved by the water instantly attracted to the hygroscopic suspension medium surrounding each particle of dye. Due to the fact, moreover, that the suspended particles of dye are reduced to an extreme fineness approaching colloidal subdivision, the suspension is a permanent one and there will therefore be no separation of the suspended dye from the solvent, even on long standing. This desirable condition is further assisted by the fact that the suspension medium is a highly viscous fluid.

The advantages of the product of the present invention have already been pointed out in some detail. By the elimination of the soap or other thickening agent, and of the usual volatile solvents, a product is obtained which substantially avoids caking, hardening and the solidification of the product in its collapsible tube or other container, which permits of instant dilution and solution upon the addition of the product to the water in which the dyeing operation is to take place, even if the water is quite cold, and which in other ways provides a superior product of such physical characteristics that it may with great success be packaged in collapsible tubes, a highly desirable form of packaging the product hitherto not capable of being used with success since the products hitherto made have not possessed the properties rendering them fit for packaging in this type of container.

What I claim is:

1. A liquid dyeing composition substantially free from soap and other thickening agents, and also from readily volatile solvents, comprising a viscous substantially anhydrous solvent and a coal-tar dye dissolved in the same.

2. A liquid dyeing composition substantially free from soap and other thickening agents, and also from readily volatile solvents, comprising a viscous substantially anhydrous hygroscopic solvent and a coal-tar dye dissolved in the same.

3. A liquid dyeing composition substantially free from soap and other thickening agents, and also from readily volatile solvents, comprising substantially anhydrous glycerin and a coal-tar dye dissolved in the same.

4. A liquid dyeing composition substantially free from soap and other thickening agents, and also from readily volatile solvents, comprising a viscous solvent and a substantially anhydrous coal-tar dye partly in solution and partly in suspension in the same.

5. A liquid dyeing composition substantially free from soap and other thickening agents, and also from readily volatile solvents, comprising a viscous substantially anhydrous hygroscopic solvent and a coal-tar dye partly in solution and partly in fine suspension in the same.

6. A liquid dyeing composition substantially free from soap and other thickening agents, and also from readily volatile solvents, comprising substantially anhydrous glycerin and a coal-tar dye partly in solution and partly in suspension in the same.

7. A liquid dyeing composition substantially free from soap and other thickening agents, and also from readily volatile solvents, comprising substantially anhydrous glycerin and a coal-tar dye partly in solution and partly in colloidal suspension in the same.

8. The method of preparing a liquid dyeing composition substantially free from soap and other thickening agents, and from readily volatile solvents, which comprises grinding a coal-tar dye in the presence of a substantially anhydrous viscous solvent for the same.

9. The method of preparing a liquid dyeing composition substantially free from soap and other thickening agents, and from readily volatile solvents, which comprises finely dividing a coal-tar dye in the presence of substantially anhydrous glycerin.

10. The method of preparing a liquid dyeing composition substantially free from soap and other thickening agents, and from readily volatile solvents, which comprises grinding a coal-tar dye in the presence of a substantially anhydrous viscous solvent for the same, the dye being present in an amount exceeding the amount which will dissolve in the amount of solvent used, whereby the dye will be partly in solution and partly in suspension in the solvent.

11. The method of preparing a liquid dyeing composition substantially free from soap and other thickening agents, and from readily volatile solvents, which comprises finely dividing a coal-tar dye in the presence of glycerin, the substantially anhydrous amount of dye being in excess of the amount which will dissolve in the amount of glycerin used, whereby the dye will be partly in solution and partly in suspension in the glycerin.

12. The process of preparing dye baths for dyeing fabrics by predissolving a coal-tar dye in substantially anhydrous glycerin and then adding the dye so predissolved to the menstruum of the dye bath, said dye bath consisting of a liquid other than glycerin, and in which the dye predissolved in glycerin, is soluble.

13. The process of preparing aqueous dye baths for dyeing fabrics by predissolving a coal-tar dye in substantially anhydrous glycerin and then dissolving the dye so predissolved to the water of the dye bath.

14. Means for producing an aqueous dye bath for immediate service conditions, wherein the bath is produced by adding to the water thereof a fluent dyeing composition comprising a coal tar dye, dissolved in substantially anhydrous glycerin and which will be taken up within the dye-bath solution as a definite part thereof.

15. Means for producing an aqueous dye bath for immediate service conditions, wherein the bath is produced by adding to the water thereof a fluent dyeing composition comprising a coal-tar dye and substantially anhydrous gylcerin, the amount of dye material being present in excess of the quantity held in true solution therein and which will be taken up within the dye bath solution as a definite part thereof, all of the dye material becoming active to augment and complete the dye value of the bath in the presence of the water used in completing the bath.

In testimony whereof, I have signed my name to this specification this 22nd day of March, 1922.

ALBERT DAVID.